April 30, 1968 T. J. DUNSHEATH ET AL 3,380,680

METHOD AND APPARATUS FOR MAINTAINING PROPER TAPE TENSION ON A TAPE RECORDER

Filed Dec. 10, 1965 3 Sheets-Sheet 1

*INVENTORS*
THOMAS JUDSON DUNSHEATH
DELMAR RONALD JOHNSON

BY *Anderson, Luedeka, Fitch, Even, & Tabin*
*ATTORNEYS*

INVENTORS
THOMAS JUDSON DUNSHEATH
DELMAR RONALD JOHNSON

BY Anderson, Luedeka, Fitch, Even, & Tabin
ATTORNEYS

INVENTORS
THOMAS JUDSON DUNSHEATH
DELMAR RONALD JOHNSON
BY Anderson, Luedeka, Fitch, Even, & Tabin
ATTORNEYS United States Patent Office 3,380,680
Patented Apr. 30, 1968

3,380,680
METHOD AND APPARATUS FOR MAINTAINING PROPER TAPE TENSION ON A TAPE RECORDER

Thomas Judson Dunsheath, Glenview, and Delmar Ronald Johnson, Des Plaines, Ill., assignors to Ampex Corporation, Redwood City, Calif., a corporation of California
Filed Dec. 10, 1965, Ser. No. 512,947
7 Claims. (Cl. 242—55.12)

ABSTRACT OF THE DISCLOSURE

A tape tension control system is provided for use in a magnetic tape transducing apparatus of the isolated loop type wherein the tension in the transducing loop is influenced by the output tension between the takeup reel and the tape drive, the magnitude of this output tension being inversely related to the tape wrap radius on the takeup reel. The tape tension control system includes a servo system which responds to changes in input tension to produce an opposite change in the braking on the supply reel thereby reducing the change in input tension and hence any change in tension at the transducing means. However, the gain of the servo loop is not so great as to maintain the tension completely constant; rather, it is permitted to vary as the tape wrap radius of the supply reel varies. The effect of the change of the supply reel tape wrap radius on the tape tension at the transducer is made substantially complementary to the change in tape tension at the transducer occasioned by changes in the tape wrap radius on the takeup reel so that the two variations substantially offset one another.

The present invention relates to maintaining a constant tension in the tape of a magnetic tape recorder during recording and/or reproducing, and more particularly to a tape tensioning system for maintaining constant tape tension at the transducing heads of a tape recorder having an isolated transducing loop.

Tape transports for magnetic tape recording and/or reproducing apparatus generally include supply and takeup reels. In such transports the tape is directed from the supply reel onto the takeup reel over a series of guides and past a transducing station where signals are transduced on the tape by a recording or reproducing head assembly. The tape is driven past the transducing station by tape drive means. The present invention has application to a tape recorder wherein the tape drive means comprises a capstan drive both before and after the transducing station which together act to isolate the transducing station from the remainder of the tape path. The tape recorders of this nature may be considered to have as isolated transducing loop and therefore to be of the isolated loop type. As will be discussed below, however, this isolation is not perfect, and indeed, it is one of the objects of the present invention to overcome the imperfection of such isolation.

The capstan drive of the recorders of the isolated loop type may be said to be a dual capstan drive. A dual capstan drive may be comprised of two separate capstans driven together. Alternatively, it may comprise a dual wrap capstan where both drives are on the same shaft. In any event, the dual capstan drive may be said to comprise a supply drive means and a takeup drive means. The supply drive means pulls the tape from the supply reel and delivers it to the transducing station where it passes the transducing head assembly for the recording or reproducing of a signal on the tape. A brake is coupled to the supply reel to provide a braking force thereon which places the tape in tension between the supply reel and the supply drive means. The takeup drive means advances the tape from the transducing station to the takeup reel. The takeup reel is driven to maintain tension in the tape between the takeup drive means and the takeup reel.

It has been recognized that a relatively constant tension should be maintained in a tape in order to avoid time base distortion during recording and/or reproducing. It has further been known to utilize a tape tension servo brake to regulate the tension in the tape. Such a device may include a tension lever to which a counter moment bias is supplied by a biasing means, such as a reference spring. The tape passes over a guide on the lever, the lever being attached also to a brake on the supply reel. As the tape passes over the guide, the lever responds to the tape tension as sensed by the guide and acts to adjust the brake to reduce the variation in tape tension. That is, a compensating variation in the drag placed on the tape by the supply reel brake is fed back to change the tape tension in such direction and amount as to offset the change that would otherwise occur.

It is not practical to measure the tape tension in the transducing loop, and therefore the tape tension has been measured between the tape supply reel and the supply drive means. It has been assumed that when the tape was placed in a constant predetermined tension at the supply reel, a constant tension would be attained in the transducing loop, and this is very nearly true in many tape recorders. For example, if the tape were positively driven at a constant rate by the capstan drives, the stretch in the tape at the transducing station would remain constant, if the stretch in the tape were maintained constant as the tape first passed the supply capstan drive from the supply reel.

On the other hand, it has been discovered that the tape tension at the transducing head assembly is influenced by the tension in the tape following the takeup capstan drive in a tape recorder of the isolated transducing loop type where the output capstan drive includes deformable driving elements. Such capstan drives include drives of the biased friction drive type where the tape is driven by the friction force between the tape and the deformable covering on the capstan. Such a drive is distinguished from a capstan wherein the tape is biased against a substantially non-deformable capstan surface by a rubber covered idler roll. With such a deformable takeup capstan drive, the tape tension in the transducing loop naturally varies with the tape tension at the takeup reel. This tape tension at the takeup reel ordinarily varies as the tape accumulates upon the takeup reel. Thus, in tape recorders of the prior art where the tension at the supply reel was maintained constant, the tension at the transducing station nevertheless varied.

In accordance with the present invention, means is provided for avoiding the influencing of variations in the tape tension following the takeup capstan drive. The invention is particularly directed to tape recorders where the takeup reel is driven with constant torque, thereby producing a tape tension at the takeup reel which decreases as tape accumulates on the reel for the reason that the moment arm of the tape at the reel is increased. This moment arm is known as the tape wrap radius, i.e., the radial distance from the axis of rotation to the point of tangency of the tape to the reel. The magnitude of the tape tension following the takeup capstan drive is thus inversely related to the tape wrap radius at the takeup reel.

Were it not for the present invention, this decrease in tape tension at the takeup reel would produce a decrease in tape tension at the transducing head. However, according to the present invention, a compensating increase in tape tension in the transducing loop is effected by increasing the tension in the tape between the supply reel and the supply capstan drive. Thus, rather than maintaining the tape tension constant as measured between the supply reel and the supply capstan drive, this tension is caused to vary in a predetermined manner complementary to the variation in the tape tension at the takeup reel. This input tape tension is varied in such manner as substantially to offset variance in tape tension at the transducing heads which otherwise would be caused by the change in tape wrap as tape accumulated upon the takeup reel.

The present invention is based upon the fact that as the tape builds up on the takeup reel, it is being withdrawn from the supply reel. As the tape is withdrawn from the supply reel, the tension in the braking system for the supply reel tends to produce a greater tension in the tape at the supply reel because the moment arm of the tape (the tape wrap radius) is smaller. Such increase in tension is sensed by a tension sensing system which operates as part of a servo system to feed back a signal to decrease the braking force, thus regulating the tape tension at the supply reel. In the prior art, such servo systems have been provided with sufficient gain to make the servo error substantially zero, thus maintaining the input tape tension substantially constant.

In accordance with the present invention, the servo system is made so that the braking force is not reduced enough to keep the input tension constant. The input tension therefore increases as the amount of tape on the supply reel decreases. Thus, as the amount of tape on the respective reels varies, the input tape tension can be made complementary to the output tape tension to maintain a substantially constant tension in the tape at the transducing station.

The tension in the tape may depend upon the countermoment bias supplied by a reference spring. During recording it is ordinarily desirable that a particular predetermined tension be placed in the tape in order that all recording operations be performed with the same tape tension. During reproduction, it is desirable that the tape be stretched the same amount as during recording in order not to introduce a time base distortion. However, this stretching is not necessarily achieved with the same tape tension because other variables influence the stretch in the tape, e.g. temperature and humidity. Also the tape may have been recorded on another machine. Means is therefore provided to adjust the tape tension during reproduction. Means is also provided for automatically returning the tape tension to a nominal value when the machine is placed in the record mode.

It is therefore a primary object of the present invention to provide a method and apparatus for maintaining a constant tension in the transducing loop of the tape of a magnetic tape recorder of the isolated loop type. Another object of the invention is to provide a method and system for compensating for variations in the change in tape tension at the transducing head assembly occasioned by variation in tape tension at the takeup reel.

Another object of the invention is to provide a tape tension servo mechanism that produces a predetermined change in input tape tension as tape is withdrawn from the supply reel that is complementary to variations in tape tension at the takeup reel occasioned by the accumulation of tape upon the takeup reel.

Another object of the invention is to provide means for adjusting the tape tension in the transducing loop during a reproducing operation while providing automatic return to a nominal value when the machine is thereafter placed in record mode. Other objects and advantages of the invention will become apparent from consideration of the following description particularly when taken in connection with the accompanying drawings wherein.

Figure 1:
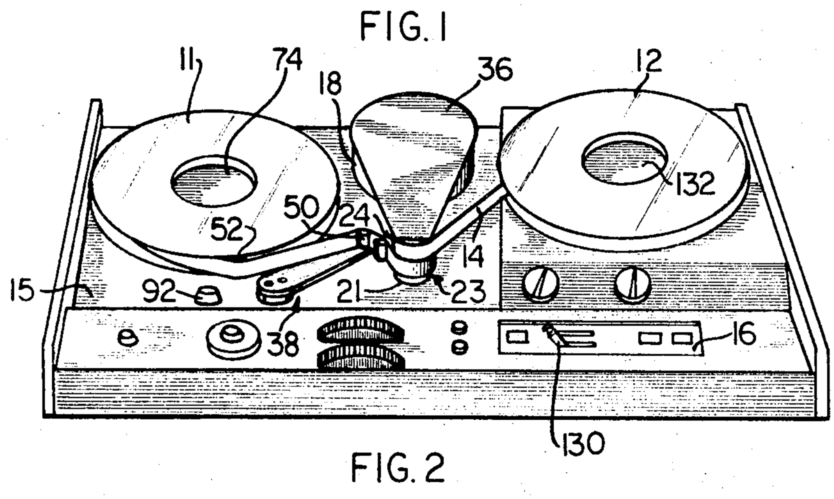
FIGURE 1 is a perspective view of magnetic tape recording and reproducing apparatus incorporating the present invention.

Referring now more particularly to the drawings, a tape transport for video magnetic tape recording or reproducing apparatus is shown. The tape transport shown herein is not necessarily the only type of transport which could incorporate the invention, and is shown for the purposes of illustration only. The tape transport includes supply and takeup reels 11 and 12 mounted for rotation upon a deck 13 at spaced positions thereon and serving to store the magnetic tape 14. As may be seen in FIGURE 1, the deck 13 is covered by a panel 15 with appropriate openings for the guides and other elements to be subsequently described. A control panel 16 is mounted over the front part of deck 13 for supporting the mechanical and electrical controls of the apparatus. The supply reel 11 is mounted upon the deck surface proper, while the takeup reel 12 is mounted on the deck 13 above the panel 15, so as to be elevated with respect to the supply reel for purposes subsequently described. The supply and takeup reels may be coupled to separate electric drive motors or to a single motor driving system (neither of which is shown) in a suitable manner. As will be described in greater detail below, the takeup reel is driven with a constant torque to maintain tape tension and to wind up tape on the takeup reel during normal operation. The length of tape 14 extending between the reels 11 and 12 is wrapped helically about a transducing assembly 18. The transducing assembly has a generally cylindrical outer surface and may include a rotating transducing head 19 for engaging the tape as it passes helically around the outer surface of the transducing assembly 18. The transducing head operates to record information on the tape or to produce electrical signals from information already recorded on the tape.

In order to facilitate driving and guidance of the tape helically about the scanning assembly, a rotatable capstan 21 is mounted upon the deck 13 in forwardly spaced parallel relation to the cylindrical transducing assembly 18. As shown, the capstan 21 is of the dual wrap type. The tape 14 engages the capstan 21 both before and after it passes by the transducing assembly 18. The capstan 21 has a deformable covering 22 made of rubber or rubber-like material which provides a high coefficient of friction for advancing the tape 14. The tape 14 wraps around the capstan 21 nearly 180° both before and after it passes the transducing assembly 18. The tension in the tape 14, together with the high coefficient of friction, permits the capstan 21 to drive the tape 14. The dual wrap capstan 21 thus provides a supply capstan drive 23 and a takeup capstan drive 24. The supply capstan drive 23 pulls the tape 14 from the supply reel 11, and the takeup reel 12 is driven to take up the tape 14 after it leaves the takeup capstan drive 24.

Figure 2:
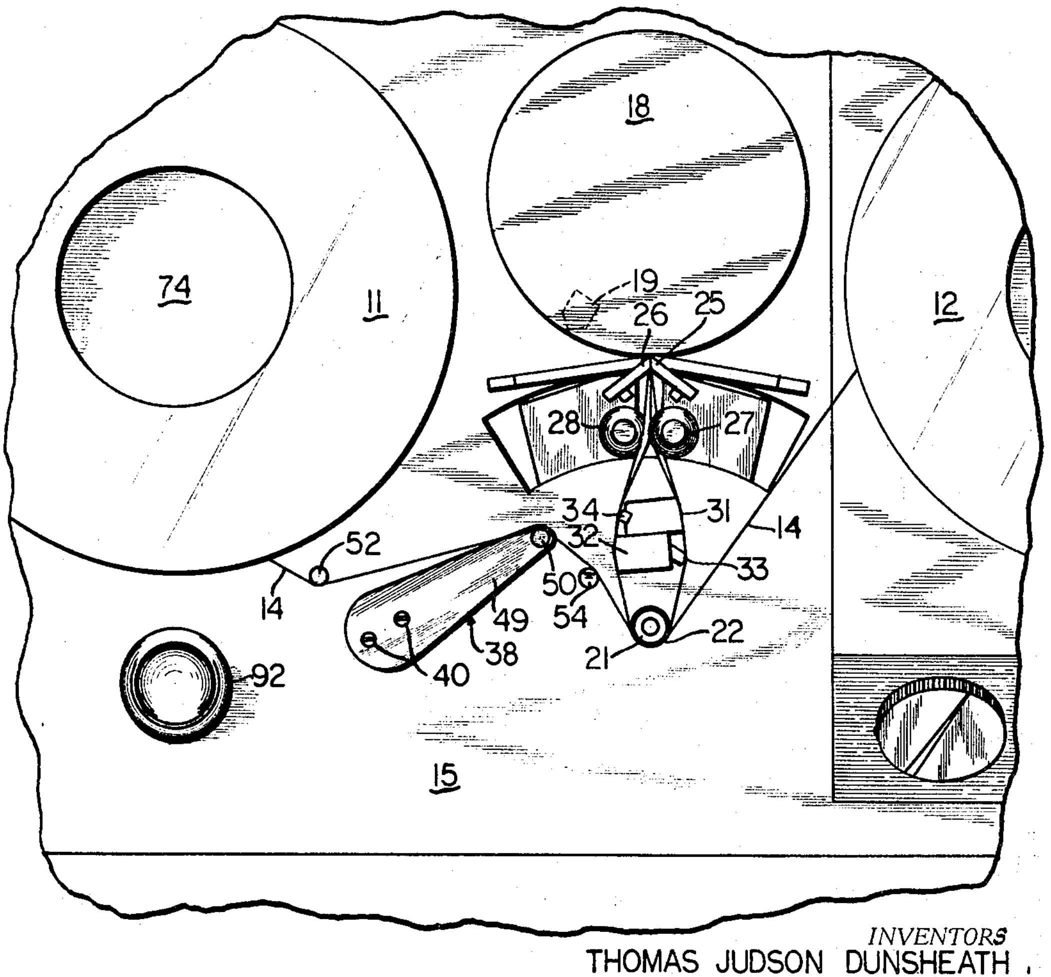
FIGURE 2 is a plan view of the tape transport of the apparatus of FIGURE 1 with the cover panel removed from the transducing drum assembly.

As shown in FIGURE 2, uniformly cylindrical entrance and exit guide posts 25 and 26 are mounted upon the deck close to the periphery of the transducing assembly 18 and on opposite sides of a line between the transducing assembly axis and the capstan axis. The posts are parallel to the axis of the transducing assembly 18. In addition, a pair of spindles 27 and 28 are mounted upon the deck 13 on opposite sides of the line between the capstan axis and the transducing assembly axis at points between capstan 21 and the posts 25, 26. The tape 14 leaving the supply reel 11 extends around the lower portion of the capstan 21, that is, about supply capstan drive 23, about the downwardly tapered lower half of spindle 27, through the gap between posts 25 and 26, around the entrance post 25 and tangentially upon the lower portion of the transducing assembly 18.

By virtue of the shape of spindle 27, the tape is twisted slightly to slant the upper edge thereof inwardly toward the line between the capstan axis and the transducing assembly axis. This twist causes the tape entering the transducing assembly 18 to follow a rising path as it extends substantially 360° around the transducing assembly to the exit post 26. The tape thus extends about the transducing assembly in a helical wrap. The taper of the spindle 27 is, moreover, preferably selected to impart a pitch to the helical wrap which advances the tape vertically by substantially one entire width of the tape in passing around the transducing assembly 18 to a point adjacent the exit post 26. The tape then tangentially leaves the assembly 18 to extend around the exit post 26 and through the gap between the posts 26 and 25.

The departing tape extends around the upwardly tapered upper half of spindle and around the upper portion of the capstan 21, that is, takeup capstan drive 24, onto the takeup reel 12. A twist is applied to the tape as it extends about the upper half of spindle 28. The taper of the upper half of this spindle is equal but opposite to that of the lower half of the sindle 27 such that the tape is twisted to slant the upper edge thereof outwardly from a line between the transducing assembly axis and the capstan axis by an amount equal to the inward slant of the upper edge arising from the original twist effecting the helical wrap. Thus, the departing tape is returned to a path parallel to the deck 13 before it reaches the capstan 21 so that the tape 14 extends uniformly thereabout and is directed tangentially upon the takeup reel without wrinkling or twisting.

As previously noted, by virtue of the helical wrap the tape rises in passing around the transducing assembly 18, and it is for this reason that the takeup reel is mounted in elevated position above the panel 15. A pair of transducing heads 31 and 32 are provided to engage the tape between the capstan and the spindles 27 and 28 both as it approaches and as it leaves the transducing assembly 18. A pair of guides 33 and 34 are provided adjacent the transducing heads 31 and 32 to cooperate therewith in providing the proper tape path between the capstan 21 and the spindles 27 and 28. As shown in FIGURE 1, the transducing assembly 18, the capstan 21, and all of the elements disposed therebetween may be covered by a decorative and protective panel 36. In FIGURE 2, the apparatus is shown with the panel 36 removed.

Although the guidance arrangement of the tape transport illustrated in the drawings and herein described is such as to provide an "omega" helical wrap about the transducing assembly 18, it is to be noted that this specific form of wrap is purely exemplary and that other wraps, helical or otherwise, extending exactly 360° or substantially less than 360° may as well be employed with the invention by appropriate modification of the tape guidance system. A 180° wrap may, for example, be employed with two heads mounted at diametrically opposite points of the head drum to facilitate recording and playback of tracks containing complete fields of a television signal, as opposed to complete frames recorded and reproduced by a single head scanning the tape in a substantially 360° wrap.

A desideratum in helical scan magnetic tape recording or reproducing apparatus is that the tension of the tape at the transducing assembly be carefully controlled at all times. The accuracy of the timing information of the video signal is dependent upon maintaining accurate and stable tape dimensions. A known device for controlling the tape tension is a mechanical tape tension servo brake. Such a device is simple and reliable and does not dissipate heat or require the use of large amounts of electric power.

Tape tension servo brakes generally utilize a brake on the supply reel for resisting the withdrawal of tape from the reel by the capstan in order to place the tape under tension. In all designs of mechanical tape tension servo brakes, the tension of the tape is sensed by some form of mechanical deflection, and this implies the use of a movable arm or lever. Some systems of this type have linked the arm or lever directly to a brake band which engages the periphery of a brake drum coupled to the supply reel. The tape passes over a guide on the lever, and a variation in tape tension produces a change in the force exerted on the guide by the tape. This change in force produces a change in the moment on the lever produced by tape tension forces, and this change in moment is translated by the lever into a corresponding change in the force on the brake band to effect a change in the drag or resistance to rotation placed upon the supply reel by the brake drum. The mechanical advantage of the forces applied to the lever by the tape tension over the forces applied to the brake band by the lever determine the gain in the mechanical feedback from the tape to the brake.

Figure 5:
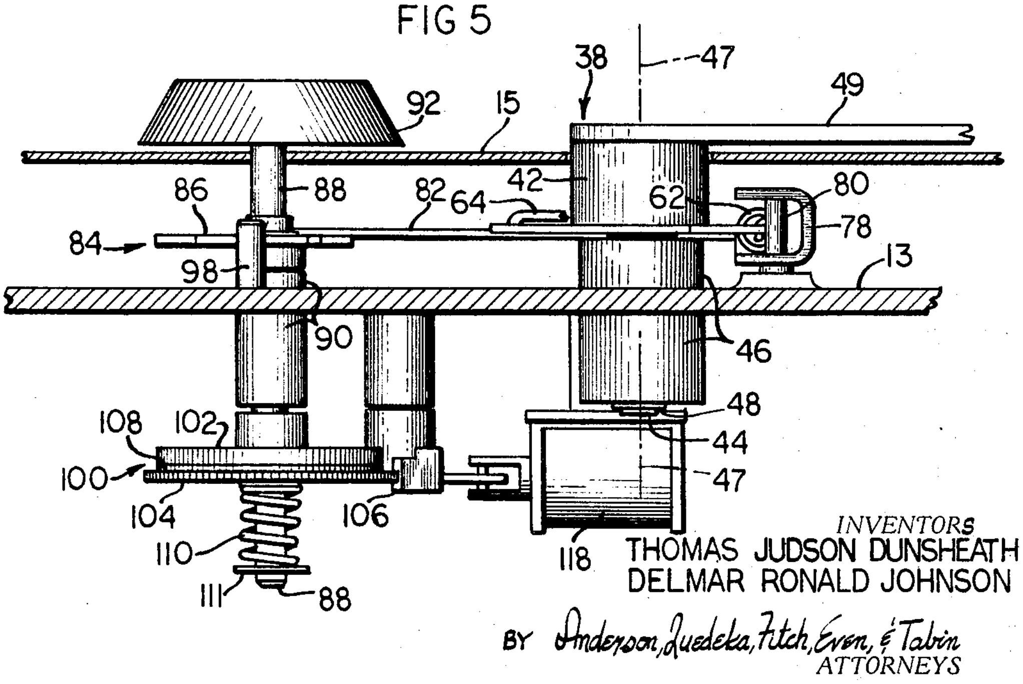
FIGURE 5 is a front view of the sensing lever and tension adjusting mechanism shown in FIGURE 3, taken along line 5—5 of FIGURE 3.

In accordance with the present invention, a lever 38 is mounted for rotation on the deck 13. As shown best in FIGURE 5, the lever 38 is fastened as by screws 40 (FIGURE 2) to a collar 42 which is secured, as by keying, to a shaft 44 which is rotatably mounted in bushings 46. As shown, the bushings 46 may be secured to the deck 13 by being cast integrally therewith. The lever 38 is thus mounted for rotation about an axis or fulcrum 47. The shaft 44 may be held in place by a lock washer 48.

The lever 38 includes a lever arm 49. At the free end of the lever arm 49 is a guide 50. The lever 38 is mounted so that the guide 50 engages the tape between the supply reel 11 and the capstan 21 (FIGURE 2). In order that the tape be properly guided over the guide 50 and to provide a fixed amount of tape wrap about the guide 50, guide 52 is mounted on the deck 13 between the guide 50 and the supply reel 11. Another guide 54 is mounted on the deck 13 between the guide 50 and the capstan 21. The guides 52 and 54 not only guide the tape in a horizontal plane in the proper tape path, but also guide the tape vertically to hold it in the same horizontal plane as it passes from the supply reel 11 to the capstan 21.

The guide 54 is disposed relative to the guide 50 and the lever 38 so that the tape 14 passing between the guides 50 and 54 is moving in a direction substantially normal to the lever arm 49. As shown in FIGURE 2, the guide 54 is positioned outside the arc of lever arm 49 to permit the lever arm 49 to swing inside the guide 54 when it is desired to move the lever 38 out of operating position. At each guide it is preferable that the tape wrap at least 15° thereabout in order to permit the guide to provide a positive guiding action. At the same time the wrap is kept relatively small to keep friction low.

The tape path from the guide 52 to the guide 50 is preferably, as shown, along a line generally in the direction of the lever arm 49. The force exerted by the tape as it reaches the guide 50 is generally toward the shaft 44 and hence does not place much torque upon the lever 38. The force produced by the tension in the tape as it leaves the guide 50 is substantially normal to the lever arm 49 and hence produces a torque substantially equal to the tension in the tape times the length of the lever arm 49 between the center of shaft 44 and the outer extremity of the guide 50. The torque on the lever 38 and hence on the shaft 44 that is produced by the tape tension is therefore dependent upon tape tension, and may be used as a direct measure of tape tension.

Figures 3, 4:
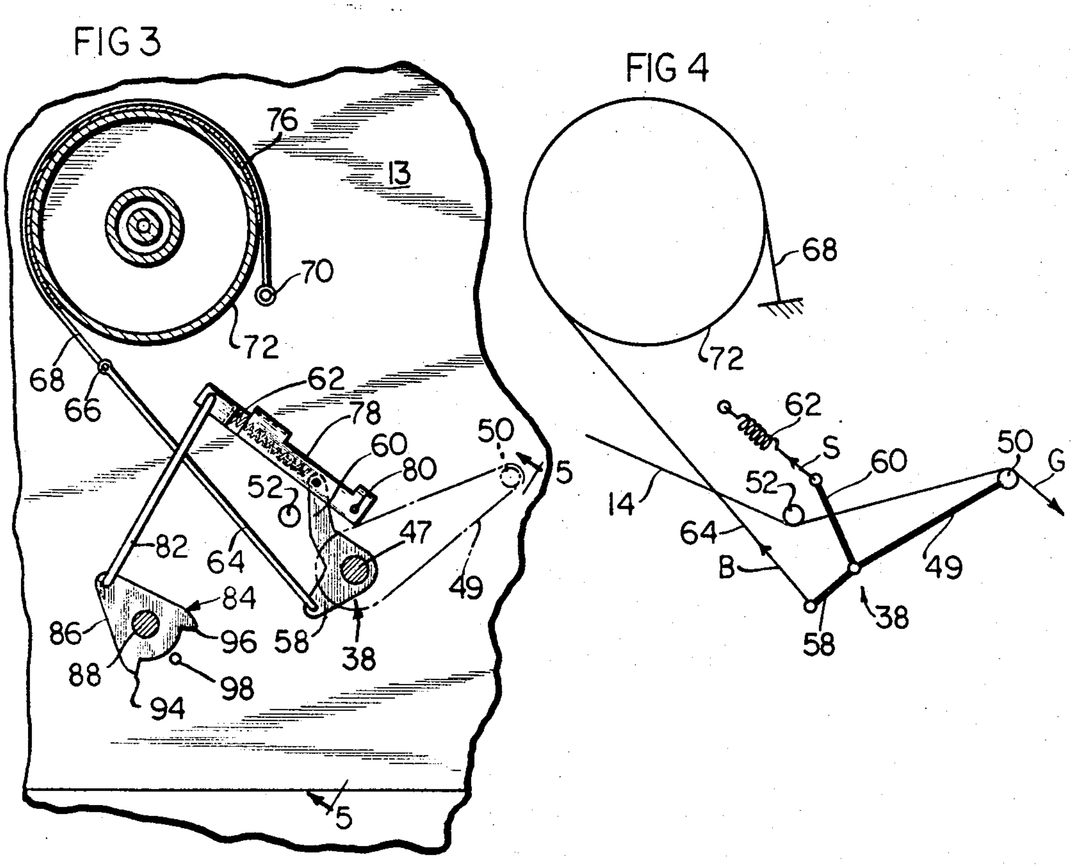
FIGURE 3 is a sectional view of the apparatus shown in FIGURE 2 taken just below the cover plate.
FIGURE 4 is a force diagram illustrating certain of the forces acting upon the tape tension control mechanism shown in FIGURE 3.

The operation of the lever 38 as part of a servo system is best illustrated in FIGURE 3. Although the apparatus is shown as a section taken below the cover panel 15, the lever arm 49 and the guide 50 are shown in phantom to illustrate the operating relationships. As shown in FIGURE 3, the lever 38 also comprises two lever arms 58 and 60 also fastened to the shaft 44, as by keying. The lever arm 60 is connected to a biasing spring 62 which is mounted in a manner to be described later to provide a reference torque to the lever arm 60 in a direction opposite to the torque produced by the tape tension.

The lever arm 58 is connected to a rod 64 which in turn is connected by a coupling 66 to one end of a brake band 68. The other end of the brake band 68 is fastened to a pin 70 mounted on the deck 13. The brake band 68 passes over a brake drum 72 which is rigidly coupled to the turntable 74 on which the supply reel 11 is mounted. Between the brake band 68 and the brake drum 72 is a pad 76 which may be made of felt and which acts to provide the appropriate friction surface for the brake. The brake drum 72 may be made of plastic. The pad 76 is secured to the brake band 68 which may be steel.

The forces on the lever arms produce the servo action. With the biasing spring mounted in the position indicated, a counter clockwise reference torque is produced by the spring force S, a clockwise torque is produced by the input tape tension G at the guide 50, and a clockwise torque is also produced by the brake band tension B. FIGURE 4 is a force diagram illustrating the action of these forces on the lever 38. Necessarily these torques are in equilibrium else the lever 38 would rotate. Of course, some small rotation may occur, but this is immediately resisted by the spring 62 if the lever rotates clockwise, or by the brake band 64 if the lever rotates counter clockwise. Expressed mathematically:

$$T_S+T_G+T_B=0$$

where:

$T_S$ is the torque exerted by the biasing spring 62;

$T_G$ is the torque exerted by the input tape tension at the guide 50; and $T_B$= is the torque exerted by the brake band 68.

Since the reference torque produced by the biasing spring 62 remains constant (unless adjusted in a manner described below), an increase in tape tension reduces the torque exerted by the brake band by relieving the tension in the brake band. Relieving the tension in the brake band in turn reduces the friction forces between the brake band 68 and the brake drum 72, thus permitting the turntable 74 and hence the supply reel 11 to rotate more freely. This reduces the force holding back the tape 14 which, in turn, reduces the input tape tension G. This closes the servo loop and acts to control the input tape tension at the guide 50. If there were a large gain in the servo loop, the input tape tension G at the guide 50 would be kept relatively constant. The gain of the loop depends among other things, upon the relative lengths of lever arms 49 and 58. As will be discussed below, according to the present invention, the relative lengths of these lever arms are made such that the servo action is not sufficient to keep the input tape tension G constant, but rather provides a predetermined change in the input tape tension G as the amount of tape on the supply reel diminishes. The predetermined change is made such as to provide a relatively constant tape tension H at the transducing head 19.

As is evident from the above equation, the reference torque $T_S$ is equal and opposite to the sum of the tape tension torque $T_G$ and the brake band torque $T_B$. How the torques are divided between the brake band torque $T_B$ and the tape tension torque $T_G$ depends among other things, upon the relative lengths of the lever arms 49 and 58. The control point for the tape tension G is therefore determined by the tension in the biasing spring 62 and the length of its moment arm. As noted above, it is generally desirable that the tape tension always be the same for each recording operation, but that adjustment be possible at least in the reproducing operation. To this end, the biasing spring 62 is mounted in such a way as to provide for adjustment in the reference torque $T_S$ while permitting automatic return to a nominal torque when the recorder is placed in the record mode.

One end of the biasing spring 62, is, of course, fastened to the lever arm 60. The other end of the spring 62 is carried by an arm 78 mounted for rotation about a pin 80 secured to the deck 13. The free end of the arm 78 is coupled through a rod 82 to a control lever 84. The control lever 84 may, as shown, comprise a plate 86 rigidly mounted on a shaft 88 rotatably mounted in bushings 90 in turn mounted on the deck 13. The shaft 88 may be manually rotated by means of a knob 92 affixed to the shaft 88 above the panel 15. The rotation of the lever 84 is limited by ears 94, 96 on the plate 86 and a stop 98 on the deck 13.

The shaft 88 is held in position by means of a brake 100 which may, as shown, comprise a flange 102 rigidly secured to the shaft 88, and a serrated disc 104 loosely disposed on the shaft 88. The serrated disc 104 is held against rotation by a finger 106 secured to the deck 13 in a manner described in greater detail below. A felt 108 is disposed between the flange 102 and the disc 104 to provide the desired coefficient of friction therebetween. The disc 104 is urged against the flange 102 by a spring 110 disposed between the disc 104 and a lock washer 111 on the lower end of the shaft 88. This provides the desired braking force to hold the shaft 88 in position while at the same time permitting an operator to turn the shaft 88 manually against the brake 100.

The control lever 84 is shown in the position providing the nominal normal reference torques $T_S$. For reasons that will appear later, with the control lever 84 in this position, the biasing spring 62 is in its most contracted condition, where the two points between which the spring 62 acts are in line with the pivot pin 80, located outside those two points. The pieces are manufactured and assembled so that the tape tension normally desired for recording is attained with the control lever 84 and spring 62 in these positions.

When it is desired to vary the reference torque $T_S$, as to control the tape tension during a reproducing operation, the control lever 84 may be turned. This correspondingly pivots the arm 78. Pivoting the arm 78 in either direction from the position shown increases the tension in the spring 62, but the effect of this is negligible relative to the effect of the change in the moment arm of the spring force S. Turning the knob 92 clockwise decreases the moment arm and hence the reference torque $T_S$; whereas, turning it counter clockwise increases the moment arm and hence the reference torque $T_S$. This adjustment is conveniently made while observing the picture as it is being reproduced; thus the tape tension may be adjusted to that value providing the best picture.

Figure 6:
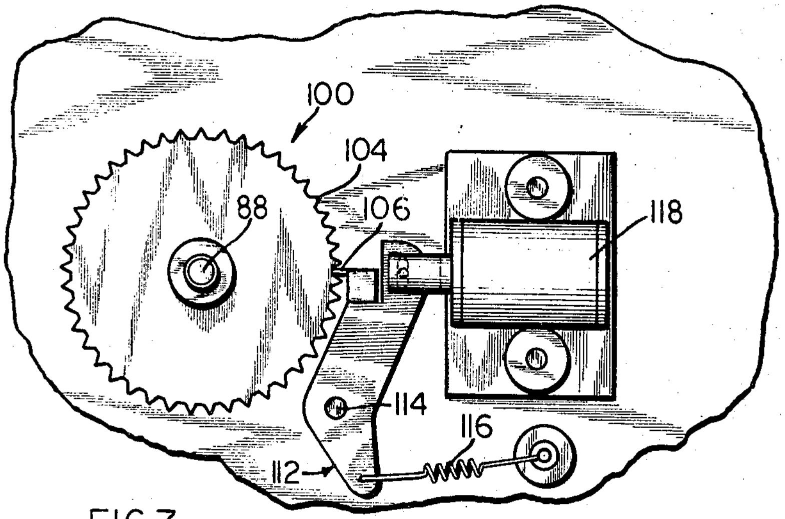
FIGURE 6 is a bottom view of the apparatus shown in FIGURE 5.

When the recorder is returned to its record mode, it is desirable that the reference torque $T_S$ be automatically returned to its nominal value. To this end, a brake release mechanism is provided. The finger 106 is rigidly mounted on a lever 112 which is rotatably mounted on a pin 114. As viewed in FIGURE 6, a spring 116 biases the lever 112 in a counter clockwise direction to urge the finger 106 between serrations on the periphery the disc 104. A solenoid 118 operates when energized to move the lever 112 clockwise (as viewed in FIGURE 6), thereby withdrawing the finger 106 from the serrations. This releases the disc 104, and it is free to rotate. Now will become apparent the reason for making the apparatus with the spring 62 providing the nominal reference torque $T_S$ while in the position shown in FIGURE 3. As noted above, the spring 62 is in its most contracted condition when in the position shown. Therefore, when the brake 100 is released upon energization of the solenoid 118, the spring 62 contracts to the position shown, thus returning the reference torque $T_S$ to the nominal value proper for the recording operation.

Figure 7:
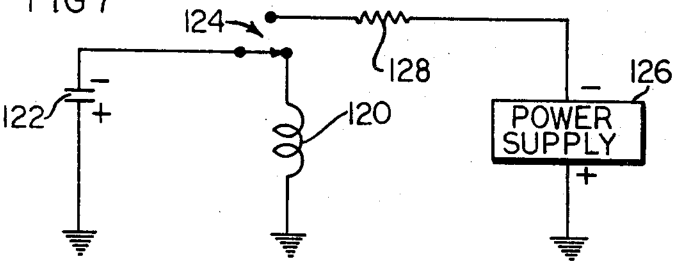
FIGURE 7 is a diagrammatic illustration of the electric circuit for operating the release mechanism shown in FIGURES 5 and 6.

It is desirable that the brake be released automatically whenever the recorder is switched from the reproduce mode to the record mode, so that the recording operation will automatically be performed with the proper nominal tape tension. This automatic brake release may be achieved with the circuit illustrated in FIGURE 7. The solenoid 118 comprises an actuating coil 120. The solenoid 118 operates when current is passed through the coil 120. In the circuit illustrated, this current is passed through the coil 120 from a capacitor 122 whenever a switch 124 closes the circuit between the coil 120 and capacitor 122 after the capacitor 122 has been charged. The capacitor 122 is charged from a power supply 126, which may be a power supply already present in the recorder, as for providing −17 volts D.C. for transistor operation. A resistor 128 is provided to limit the current surge when the charging is begun. The switch 124 is shown in the solenoid actuating position. The switch 124 is operated by a switch actuating lever 130, and may be part of a ganged switch, making and breaking the various connections necessary for switching the recorder between its record and reproduce modes.

Thus, when the lever 130 is pushed to the reproduce position, the capacitor 122 is fully charged from the power supply 126. When the lever 130 is thereafter pushed to the record position, the charge from the capacitor 122 surges through the coil 120, momentarily operating the solenoid 118 and thereby withdrawing the finger 106 from the serrations in the disc 140 and releasing the brake 100. The spring 62 thereupon returns to its most contracted position and provides the nominal reference torque $T_S$ that produces tape tension suitable for recording. It should be noted that the release of the brake 100 is only momentary, for once the capacitor 120 has been discharged, the spring 116 returns the finger 106 to its position between serrations, and the reference torque $T_S$ may thereafter be adjusted, even with the recorder in the record mode.

As described above, the measured input tape tension G is used to operate the servo system to control the tape tension. However, it is the tape tension H at the transducing head 19 that is to be kept relatively constant. In a recorder of the isolated transducing loop type where the output capstan drive is deformable, the output tape tension L influences the tape tension H at the head. Over a certain range of tape tensions, the relationship can be approximated as:

$$H=aG+bL$$

where $a$ and $b$ are constants.

Figure 8:
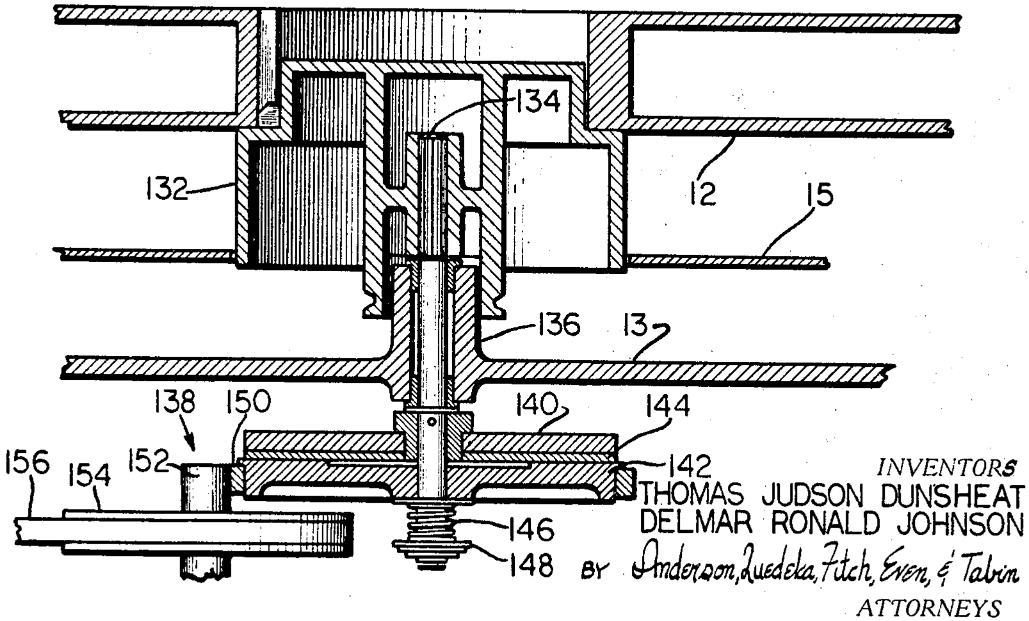
FIGURE 8 is a sectional view of the takeup reel drive for the apparatus shown in FIGURE 2, taken through the center of the reel.

If the takeup reel 12 is driven at constant torque, the tape tension L will vary inversely with the tape wrap radius $R_T$ on the takeup reel 12. A constant torque drive is a common type of drive. Such a drive may be as shown in FIGURE 8 and described in greater detail below. With such a drive, the contribution of output tape tension L to the tape tension H varies inversely with tape wrap radius $R_T$ and hence decreases as the tape accumulates during the recording operation. Neglecting other variables, the relationship between output tape tension L and tape wrap radius $R_T$ may be expressed as:

$$L=f_1\left(\frac{1}{R_T}\right)$$

At the same time, the gain of the servo system is made such that the input tape tension G is not kept constant. As the tape 14 is withdrawn from the supply reel 11, the moment arm for the tape leaving the reel 11 decreases. For a given brake band tension B, this increases the input tape tension G. The servo system operates to reduce the increase, but it does not eliminate it. The input tape tension, G therefore varies inversely with the tape wrap radius $R_S$ on the supply reel. Neglecting other variables the relationship may be expressed:

$$G=f_2\left(\frac{1}{R_S}\right)$$

Because the tape accumulating upon the takeup reel 12 comes from the supply reel 11, the tape wrap radius $R_T$ varies as an inverse function of the tape wrap radius $R_S$. The tape tension L may therefore be expressed:

$$L=f_3(R_S)$$

The tape tension H may therefore be expressed as a function of $R_S$, independent of $R_T$:

$$H=aG+bL=af_2\left(\frac{1}{R_S}\right)+bf_3(R_S)$$

The present invention takes advantage of the fact that $R_S$ and $R_T$ are related and that the tape tension H can be stated in terms of $R_S$ and independently of $R_T$. Because of this relationship, the functions of $R_S$ can be made such that tape tension H remains substantially constant as the tape is moved from the supply reel 11 to the takeup reel 12. According to the present invention, the servo system is made such as to produce a function $$f_2\left(\frac{1}{R_S}\right)$$

whereby the variation in the contribution of the output tape tension L to the tape tension H is offset by a complementary variation in the contribution of the input tape tension G to the tape tension H. Stated mathematically, the desired relationship is:

$$aG=-bL$$

The function $f_3(R_S)$ may be determined empirically for a particular recorder. The function $$f_2\left(\frac{1}{R_S}\right)$$

depends, among other things, upon the relative lengths of the lever arms 49 and 58. By suitably proportioning the lever arms 49 and 58, the function $$f_2\left(\frac{1}{R_S}\right)$$

can be made to approximate closely the desired relationship over the limited range involved. The change in effective radius of the reels 11 and 12 as the amount of tape $R_S$ and $R_T$ changes is typically only by a factor of about two to one between a full reel and an empty reel. A full reel may have a tape wrap radius of 4¾ inches, whereas an empty reel is typically 2⅜ inches. In practice, it has been found that if the tape tension H is made the same at two substantially different tape wrap radii $R_S$, it is sufficiently constant over the entire range of interest.

Although the equations have been in some respects over-simplified, they serve to explain the principles involved. The actual construction of the device including the determination of relative dimensions of the lever arms is readily achieved by following empirical determinations. That is, rather than following a rigorous mathematical analysis, the design may be based upon trial and error, following the principles explained above, until the change in tape tension H is within tolerable limits as the tape wrap radii $R_S$ and $R_T$ change.

Other causes of change in input and output tape tensions G and L have been neglected in this analysis. Ordinarily, these other causes produce lesser changes in tape tension H, and these lesser changes are made very small by the servo system which operates to reduce changes in input tape tension G.

In FIGURE 8 there is illustrated a form of drive for driving the takeup reel 12 with a constant torque. The reel 12 is shown mounted on a turntable 132 in the form of a hub secured as by keying to a shaft 134. The shaft 134 is rotatably mounted in a bearing 136 secured to the deck 13. As shown, the shaft is driven by a friction drive 138. The friction drive 138 includes a disc 140 rigidly secured to the shaft 134. The disc 140 is driven by another disc 142 through a friction member 144 which may be an annular felt disposed between the discs 140 and 142.

The disc 142 is mounted upon the shaft 134 in a manner to rotate freely thereabout. The disc 142 is held in place and urged toward the disc 140 by a spring 146 disposed between the disc 142 and a lock washer 148 secured to the shaft 134 at its lower extremity. The disc 142 has a tire 150 disposed around its periphery. The tire is driven by a drum 152 which in turn is fastened to a pulley 154. The drum 152 and pulley 154 may be mounted on the deck 13 in any suitable manner but are preferably mounted on the end of a pivotally mounted arm (not shown) spring biased to urge the drum 152 against the tire 150. The pulley 154 is driven by a belt 156 which in turn is driven by another pulley disposed on a motor shaft (not shown).

In a conventional manner, the motor operates to drive the disc 142 at a speed faster than required to take up all of the tape driven to the takeup reel 12 by the takeup drive means 24. The tension in the tape resists the turning of the disc 140, and there is slippage between the discs 140 and 142 permitting the disc 142 to move at the driven speed while the disc 140 moves only so fast as to take up all of the slack in the tape being received from the takeup drive means 24. Since the drive means 24 is moving at a substantially constant speed and the tape wrap radius $R_T$ varies as tape is accumulated on the takeup reel 12, the speed of the disc 140 changes with the tape wrap radius. It is for this reason that the friction drive 138 is permitted to slip, for this provides a simple driving mechanism where the driving motor can operate at constant speed while driving the takeup reel 12 at precisely the speed required to take up the slack. The torque produced by the friction drive 138 is substantially constant because the friction force between the discs 140 and 142 is substantially independent of speed and the moment arm remains the same.

The tape tension control system as thus described, serves to compensate for charges in the tape tension at the transducing station due to changes in takeup reel tape wrap radius, without requiring a sensing of the output tension in the tape between the takeup drive means and the takeup reel. A preferred form of the invention has been shown and described; however, modifications may be made therein within the scope of the present invention. For example, the particular configuration and properties shown and described have been found particularly suitable for a particular video tape recorder; however, modifications may be made therein for recorders of different design without departing from the scope of the invention. The invention is limited only by the claims.

What is claimed is:

1. A tape tension control system in a tape transport for magnetic tape transducing apparatus of the isolated loop type wherein supply and takeup tape drive means are disposed respectively before and after a transducing station along the tape path and serve to drive tape from a supply reel to said station and from said station to a takeup reel, said transport including supply reel support means for rotatably supporting a supply reel of magnetic tape, brake means coupled to said supply reel support means for braking the rotation of said supply reel as tape is withdrawn therefrom by said supply tape drive means, thereby to place the tape in input tension between said supply reel and said supply tape drive means, takeup reel support means for rotatably supporting a takeup reel for receiving tape from said takeup tape drive means, takeup reel drive means coupled to said takeup reel support means for driving said takeup reel to take up tape received from said takeup tape drive means, thereby to place the tape in output tension between said takeup reel and said takeup tape drive means, the magnitude of said output tension being inversely related to the tape wrap radius of tape upon said takeup reel, the tension in the tape at said transducing station being dependent upon both said input tension and said output tension: said tape tension control system comprising servo means acting in response to a change in input tension to produce an opposite change in said braking, thereby reducing said change in input tension, said means providing a predetermined change in said input tension as tape is withdrawn from said supply reel that is complementary to the change in output tension as tape is added to said takeup reel in such proportions that changes in tape tension at said transducing head occasioned by changes in output tension are substantially offset by changes in tape tension at said transducing head occasioned by changes in input tension.

2. A tape tension control system according to claim 1 wherein said predetermined change in said input tension produces an input tension inversely related to the wrap radius of tape upon said supply reel and wherein the magnitude of said output tension is inversely related to the wrap radius of tape upon said takeup reel.

3. Apparatus according to claim 2 wherein said takeup reel drive means drives said takeup reel with substantially constant torque.

4. A tape tension control system according to claim 1 including a member rotatably mounted about an axis fixed with respect to said supply reel support means and said supply tape drive means, guide means secured to said member at a first point displaced from said axis, biasing means secured to said member for providing reference torque thereon to urge said guide means against said tape between said supply reel and said supply tape drive means, whereby said guide means engages and bends the tape as it passes said guide means, said input tension acting upon said guide means to produce a torque on said member opposite in direction to said reference torque and of magnitude directly related to the magnitude of said input tension, brake coupling means coupling said brake means to said member at a second point displaced from said axis to produce a torque on said member also opposite in direction to said reference torque and of magnitude directly related to the magnitude of said braking, said member acting through said brake coupling means in response to a change in input tension to produce an opposite change in said braking, thereby reducing said change in input tension, the relative displacements of said first and second points from said axis providing said predetermined change in said input tension.

5. A tape tension control system according to claim 4 wherein said biasing means provides a predetermined reference torque when said biasing means is in a first position, said biasing means being selectively movable from said first position to provide other selected reference torque.

6. A tape tension control system according to claim 5 including means for automatically putting said biasing means in said first position upon said transducing apparatus being placed in a recording mode.

7. A method for controlling tape tension in a tape transport for magnetic tape transducing apparatus of the isolated loop type wherein supply and takeup tape drive means are disposed respectively before and after a transducing station along the tape path and serve to drive tape from a supply reel to said station and from said station to a takeup reel, said transport including supply reel support means for rotatably supporting a supply reel of magnetic tape, brake means coupled to said supply reel support means for braking the rotation of said supply reel as tape is withdrawn therefrom by said supply tape drive means, thereby to place the tape in input tension between said supply reel and said supply tape drive means, takeup reel support means for rotatably supporting a takeup reel for receiving tape from said takeup tape drive means, takeup reel drive means coupled to said takeup reel support means for driving said takeup reel to take up tape received from said takeup tape drive means, thereby to place the tape in output tension between said takeup reel and said takeup tape drive means, the tension in the tape at said transducing station being dependent upon both said input tension and said output tension: said method comprising driving said takeup reel to produce second tension that varies inversely with the wrap radius of the tape on said takeup reel, varying said first tension as tape is withdrawn from said supply reel in a manner that is complementary to the change in second tension as tape is added to said takeup reel in such proportions that changes in tape tension at said transducing head occasioned by changes in second tension are substantially offset by changes in tape tension at said transducing head occasioned by changes in first tension.

References Cited

UNITED STATES PATENTS

| | | | |
|---|---|---|---|
| 558,426 | 4/1896 | Scott | 242—75.43 |
| 3,076,618 | 2/1963 | Van Hook | 242—75.42 |
| 3,091,410 | 5/1963 | Widener | 242—55.12 |
| 3,137,767 | 6/1964 | Axon et al. | 242—55.12 X |
| 3,219,246 | 11/1965 | Kihara | 226—181 |
| 3,270,973 | 9/1966 | Dekker | 242—55.12 |

GEORGE F. MAUTZ, *Primary Examiner.*